Patented Mar. 27, 1945

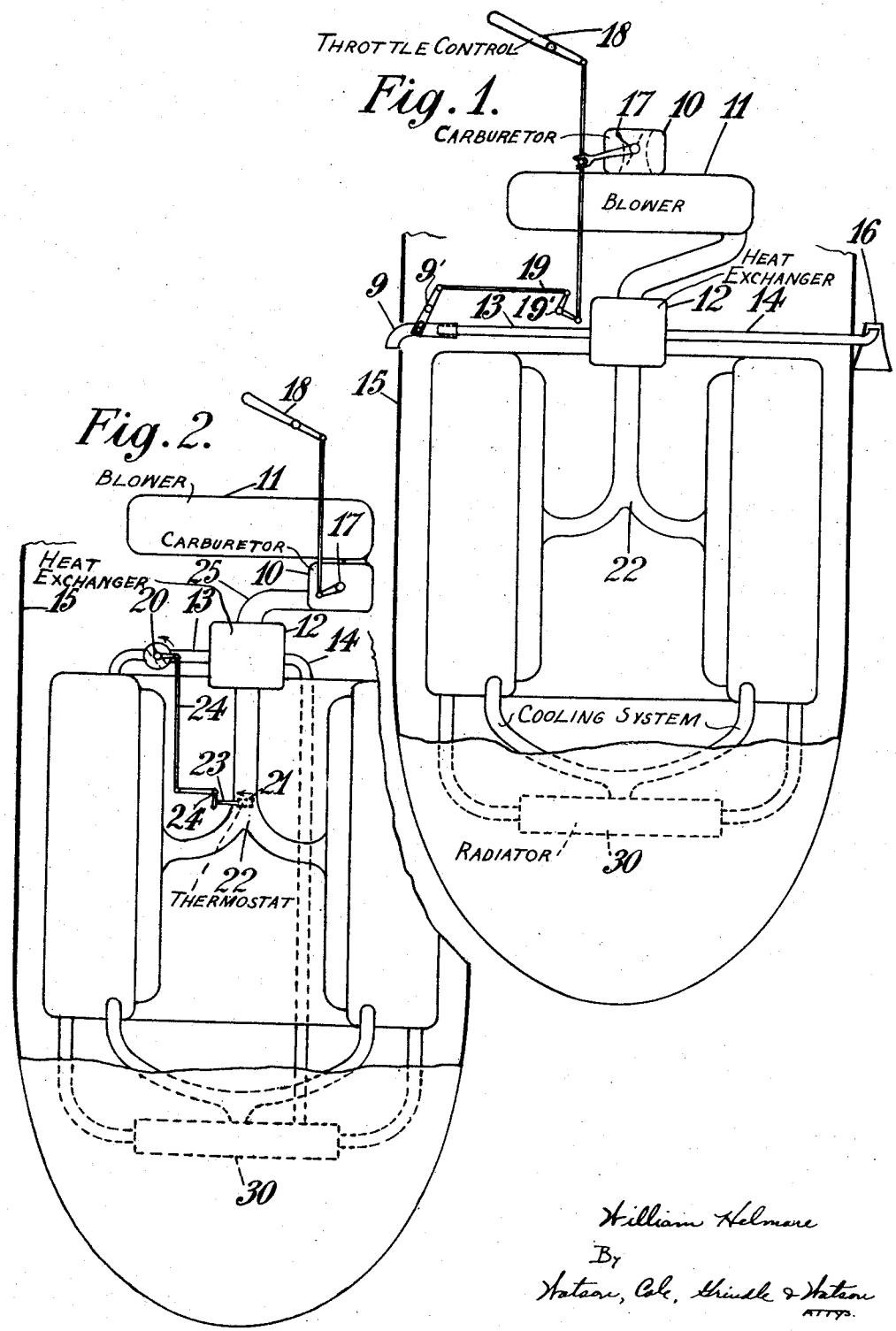

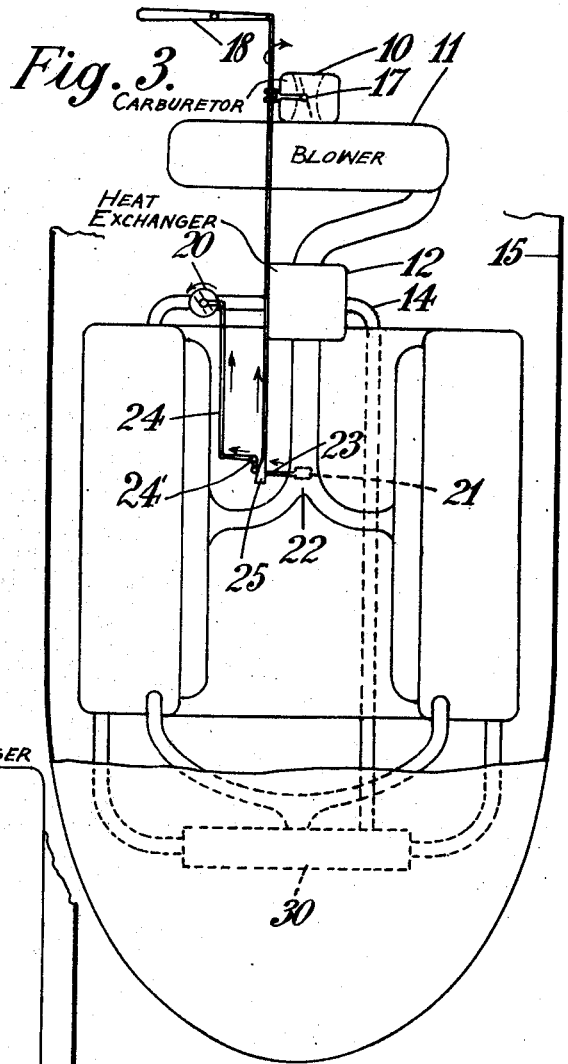
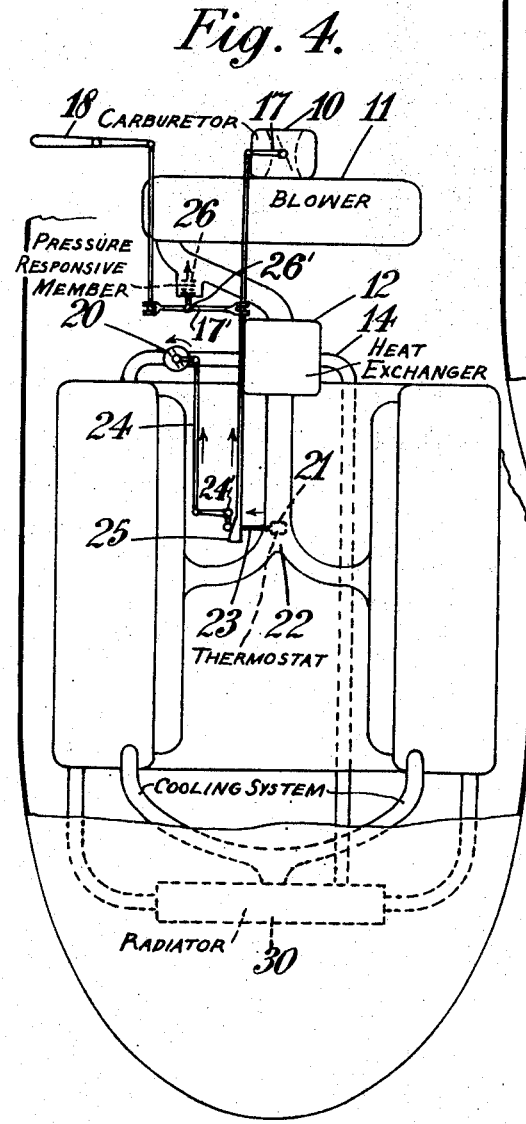

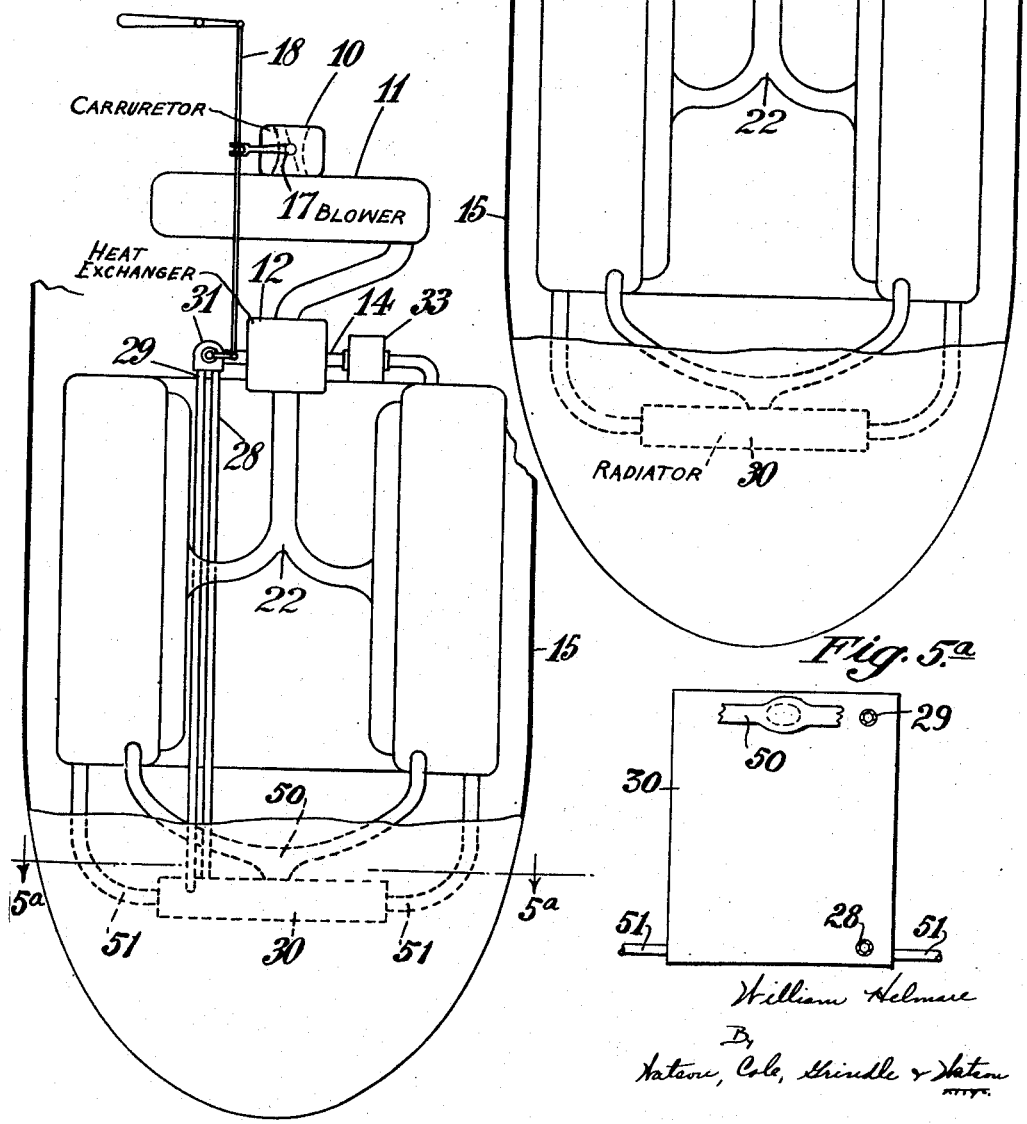

2,372,272

UNITED STATES PATENT OFFICE 2,372,272

APPARATUS FOR CONTROLLING TEMPERATURE OF BOOSTED CHARGE OF INTERNAL-COMBUSTION ENGINES

William Helmore, Cambridge, England, assignor to Imperial Chemical Industries Limited, London, England, a British company Application February 28, 1942, Serial No. 432,868
In Great Britain April 16, 1940

21 Claims. (Cl. 123—119)

This invention relates to the control of the temperature of charges supplied to internal combustion engines and particularly to supercharged aircraft engines.

It has previously been proposed to employ heat exchangers of various kinds in the induction system of such engines. For example, it has been proposed to employ the cold air external to the aircraft as the temperature controlling fluid which is caused to flow through the heat exchanger thereby reducing the temperature and tendency to detonation of the mixture and at the same time increasing its density whereby the volumetric efficiency of the engine is improved.

Although a reduction in the temperature of the mixture may be desirable under some operating conditions for example at high supercharger pressures in order to minimise the tendency to detonation and to improve the volumetric efficiency, there are other conditions under which the reduction of temperature may be undesirable for example when the engine is running with a weak mixture at reduced induction pressures. There are yet other conditions in which an increase in the temperature of the mixture may even be advantageous, for example under ice forming conditions or under conditions when the engine is running with extremely weak mixture at reduced induction pressures, or when the engine is "idling" on descent from altitude. The term "charge" used throughout the specification refers to the air supplied to the engine or to the mixture of air and fuel and the term "temperature controlling fluid" refers to the medium employed in the heat exchanger which either gives up its heat to or receives heat from the charge flowing through the heat exchanger whereby the temperature of the mixture may be governed.

According to this invention there is provided in combination with a spark-fired supercharged internal combustion engine, a heat exchanger disposed in the induction system, and means for preventing overcooling of the charge by varying the temperature and/or rate of flow of the cooling fluid passing through the heat exchanger, said means being automatically governed by the temperature and/or pressure of the charge and/or by interconnection with the engine controls determining the condition of the charge.

For example, in the case of an aircraft engine air may be employed as the temperature controlling fluid and a scoop or the like is arranged externally of the aircraft and is connected with an inlet of the heat exchanger. The flow of the temperature controlling air through the heat exchanger may be further ensured by the provision of an ejector arranged in the airstream flowing past the aircraft and connected with the outlet of the heat exchanger.

The rate of flow of the temperature controlling fluid through the heat exchanger may be controlled by means of an adjustable throttle.

The aforesaid scoop and/or ejector is or are adjustable into and out of the airstream around the aircraft. By these means not only can the rate of flow of the temperature controlling air be varied but also its temperature, since when the scoop is within the aircraft, hot air may be drawn in by the ejector which may remain outside the aircraft.

As indicated above, there may be cases in which it is desired to provide not only means for the withdrawal of heat from the charge, but also means for supplying heat thereto. For example, at the reduced mixture pressure in the weak mixture range and/or idling position of the carburetter setting the temperature may be required to be increased, whereby vaporisation of the mixture and consequently the weak mixture running of the engine is improved and/or the risk of freezing and the difficulty in rapid opening up to full power after long descent from altitude is eliminated.

Means may be provided for heating a part or whole of the temperature controlling fluid prior to its passage through the heat exchanger. For example, the scoop may be left partly projecting into the airstream, while the other part may have access to the hot air from the engine. Alternatively, separate conduits containing hot and cold temperature controlling fluid may be associated with the inlet of the heat exchanger, either or both of which conduits may be provided with throttle means, whereby the temperature and rate of flow of the mixed streams flowing to the heat exchanger may be varied. For example in a case where the engine is provided with a radiator for cooling the engine cylinders or for cooling the oil supply two conduits may be arranged to extend from the top and bottom of the radiator respectively to the inlet side of the aforesaid heat exchanger, and a mixing valve may be provided whereby the required proportion of hot and cold fluid may be arranged to flow through the heat exchanger, whereas the outlet of the heat exchanger may communicate directly or through a pump with the circuit containing the radiator.

If desired, the temperature of the temperature controlling fluid may be controlled by causing it to flow through a second heat exchanger arranged externally of the induction system, means being provided for varying the rate of flow of either the primary temperature controlling fluid or the secondary temperature controlling fluid or both through said second heat exchanger. For example, the second heat exchanger may be arranged in the airstream which constitutes the secondary temperature controlling fluid and may be provided with adjustable shutters controlling the flow of air therethrough.

The means for controlling the temperature and/or rate of flow of temperature controlling fluid may be interconnected with the engine controls such as the supercharger control or to the pilot's throttle control for the carburetter in such a manner that at high mixture pressures the rate of flow of temperature controlling fluid is increased but with a reduction of the mixture pressure the rate of flow is progressively diminished.

Alternatively, the means for controlling the temperature and/or rate of flow of the temperature controlling fluid may be interconnected with an automatic control associated with the induction system which automatic control may either control the rate of flow of gases or strength of the fuel air mixture.

The means for controlling the temperature and/or rate of flow of the temperature controlling fluid may be arranged to be operated by a pressure responsive device disposed either in the atmosphere or in the induction system. For example, in the case where a supercharger is associated with the carburetter the pressure responsive device is disposed at the outlet side of the supercharger. The pressure responsive device may comprise an automatic supercharger control which is arranged in addition to controlling the throttle of the carburetter, also to control the temperature and/or rate of flow of the temperature controlling fluid.

Alternatively, the rate of flow of the temperature controlling fluid or the means controlling its temperature may be governed by a thermostat mechanism having its heat responsive element disposed either in the stream of the temperature controlling fluid or in the induction system.

Both the pressure responsive device and the thermostat may be provided so as jointly to control the temperature and/or rate of flow of temperature controlling fluid.

Among other advantages of the applicant's invention, may be mentioned the fact that the operation of the controls is independent of humidity conditions surrounding the engine and also that the controls are operative within temperature ranges above the freezing point.

The following is a description of a number of embodiments of the invention reference being made to the drawings in which—

Figure 1 is a diagram showing one method of controlling the rate of flow and temperature of cooling air through a heat exchanger, associated with the outlet of a supercharger for a carburetter, in accordance with the movement of a hand control for the carburetter.

Figure 2 is a diagram of an arrangement in which the rate of flow of temperature controlling fluid through a heat exchanger associated with a boosted charge is controlled by thermostatic means.

Figure 3 is a diagram of an arrangement in which the rate of flow of temperature controlling fluid to the heat exchanger is controlled both by a thermostat and by the hand control for the carburetter.

Figure 4 shows an arrangement in which the rate of flow of controlling fluid to the heat exchanger is controlled both by the pressure on the outlet side of the supercharger and also by the temperature of the charge.

Figure 5 is a diagram of an arrangement in which the temperature of the temperature controlling fluid may be adjusted by varying the supply of two separate sources of the fluid at different temperatures.

Figure 5A is a fragmentary somewhat diagrammatic view taken approximately on line 5A—5A of Figure 5.

Figure 6 is a diagram of an arrangement in which the temperature of the temperature controlling fluid flowing through the heat exchanger is controlled by a second heat exchanger.

Referring to the arrangement shown diagrammatically in Figure 1, the carburetter 10 has air drawn through it by a blower 11 which delivers the charge through a heat exchanger 12 to the induction system 22 of the engine. Air is also employed as the temperature controlling fluid for the heat exchanger and is led thereto through a conduit 13 and out through a conduit 14. A scoop 9 is adjustably mounted on the inlet conduit 13 so that it may be projected through a hole in the engine fairing 15 into the air stream around the fairing. An ejector 16 is associated with the outlet conduit 14 and if desired this ejector may also be adjustable into and out of the fairing. At high engine speeds, as is known, the compressed air is liable to become heated thus adversely affecting the proportions of the combustible mixture. It is desirable therefore at large throttle openings for the charge to be cooled to a greater extent than at low throttle openings. For this purpose the pilot's throttle control 18 is arranged automatically to move the scoop 9 through link mechanism 19 into and out of the engine fairing. The linkage 19 is fulcrumed at 19' and 9' to fixed points on the engine mounting. As indicated above under certain conditions it may be of advantage to heat the charge supplied by the carburetter, such as in the idling position of the carburetter setting in which case the scoop 9 will be withdrawn into the engine fairing where hot air will be drawn through it by means of the ejector which may be left outside the fairing.

Instead of air being used for the temperature controlling fluid there may be employed the fluid from the engine cooling system or the oil supply in which case the inlet conduit 13 may receive the fluid through a throttle valve 20 such as shown in Figure 2, whereas the outlet conduit 14 leads the fluid back into the system.

In the arrangement shown in Figure 2, the carburetter is shown on the outlet side of the blower and the rate of flow of temperature controlling fluid is controlled independently of the carburetter control by means of a thermostat having a heat responsive element 21 arranged in the induction pipe 22. A movable part 23 of the thermostat is arranged to operate the throttle 20 through suitable link mechanism 24 fulcrumed at 24'. If desired the thermostat could be associated with the heat exchanger 12 or with the outlet pipe 25 of the blower. As indicated by the arrows in the figure, expansion of the thermostat element causes the throttle or control valve 20 to open.

In the arrangement shown in Figure 3, the throttle valve 20 in the supply conduit for the temperature controlling fluid is under the control both of the carburetter control 18 and under the automatic control of the thermostat. For this purpose a wedge member 25 is disposed between the movable member 23 of the thermostat and a moving part of the lever link mechanism 24 connected with the throttle control valve. The wedge member 25 is connected with the pilot's carburetter control so that the movement of the carburetter throttle moves the wedge transversely between the parts 23 and 24. The wedge member is so connected to the pilot's throttle control that it can move bodily with the moving part 23 of the thermostat. Thus should the temperature of charge vary during a set throttle position the temperature of the temperature controlling fluid for the heat exchanger will be automatically adjusted. Furthermore, if the carburetter throttle is adjusted, thereby possibly tending to alter the temperature of the charge, the throttle or control valve 20 will also be adjusted. The shape of the wedge surface may be selected in accordance with the known variation of charge temperature and different throttle openings. The arrows in this figure show the movements of the carburetor and the expansion of the thermostat in causing the control valve 20 to open.

It will be appreciated that the lever link mechanism 24 might be arranged to adjust the position of a scoop as in Figure 1.

The arrangement shown in Figure 4 is somewhat similar to that last described above, but in this instance the blower is provided with an automatic supercharger control 26 which is so inter-connected with the carburetter throttle control that any tendency to variation of pressure in the supercharger outlet is compensated by movement of the carburetter throttle. This supercharger control member 26 may be of any well known construction, such as a flexible walled expansible pressure controlled bulb. The hand operated linkage 18 is operatively connected to the carburetor actuating linkage 17 by means of the intermediate floating lever 17' which is fulcrumed at 26' to a movable part of the pressure responsive member 26. It will be noticed that the supercharger control also adjusts the throttle valve 20 which controls the rate of flow of temperature controlling fluid through the heat exchanger. Also the supercharger control is so connected with the pilot's carburetter control that either of these controls can operate on the carburetter and the throttle valve 20 independently.

As in the previous arrangement, the thermostat can also operate from the throttle 20 independently of the pilot's throttle control, and in this case independently of the supercharger control.

Referring to the arrangement shown in Figures 5 and 5A, the heat exchanger 12 may derive its temperature controlling fluid from two supplies at different temperatures. Supply conduits 28 and 29 may be arranged to communicate respectively with the bottom and top of a radiator 30 and also with a mixing valve 31. The radiator may either be the usual engine cooling radiator with the usual fluid connections 50 and 51 or a radiator for cooling the oil supply. The outlet conduit from the heat exchanger may be connected with a pump 33 which delivers the fluid back to the engine. The mixing valve may be connected with the pilot's carburetter control 18, so that the temperature of the temperature controlling fluid is varied in accordance with throttle openings. It may, however, be controlled independently of the engine throttle so that the operator can select whether to heat or to cool the charge according to the prevailing conditions.

Instead of the temperature controlling fluid being derived from the radiator for the engine or for the oil cooling system, it may be derived from a second heat exchanger as shown in Figure 6, which second heat exchanger 31 is arranged in the air stream and the temperature of which is controlled by adjustable shutters 32. The temperature controlling fluid may be drawn off from the engine cooling system or the oil cooling system. The shutters 32 may be automatically controlled, for example by the supercharger control 26 or thermostatically or may be controlled by the pilot's carburetter control 18.

I claim:

1. The combination with a spark-fired supercharged internal-combustion engine having a supercharger of a heat-exchanger disposed in the induction system, means interconnected with the control for automatically varying the heat-exchanging capacity of the temperature controlling fluid passing through said heat-exchanger so as to prevent over-cooling of the charge in the induction system.

2. The combination with a spark-fired supercharged internal-combustion engine having a supercharger, of a heat-exchanger disposed in the induction system, a pressure-responsive device, means connecting said pressure responsive device into said system at one point on the outlet side of the supercharger for the engine, and means interconnected with said pressure-responsive device for automatically varying the heat-exchanging capacity of the temperature controlling fluid passing through said heat-exchanger so as to prevent over-cooling of the charge in the induction system.

3. The combination with a spark-fired supercharged internal-combustion engine having a supercharger, of a heat-exchanger disposed in the induction system, an automatic supercharger control which is adapted in addition to controlling the throttle valve of the carburettor, to vary the heat-exchanging capacity of the temperature controlling fluid passing through said heat-exchanger so as to prevent overcooling of the charge in the induction system.

4. The combination with a spark-fired supercharged internal combustion engine, of a heat-exchanger and a thermostat both disposed in the induction system, a pilot's throttle control, means for varying the heat-exchanging capacity of the temperature controlling fluid and linkage interconnecting said thermostat, pilot's throttle control and capacity varying means so as automatically to prevent overcooling of the charge in the induction system.

5. The combination with a spark-fired supercharged internal combustion engine, of a heat-exchanger, a thermostat and pressure responsive device all disposed in the induction system, a pilot's throttle control, means for varying the heat-exchanging capacity of the temperature controlling fluid and linkage interconnecting said thermostat, pressure-responsive device and pilot's throttle control so as automatically to prevent overcooling of the charge in the induction system.

6. The combination with a spark-fired internal combustion engine having a supercharger, of a heat-exchanger disposed in the induction system, means for supplying a temperature-controlling fluid at a lower temperature than that of the supercharged gas, means for varying the heat-exchanging capacity of the temperature controlling fluid flowing to the heat-exchanger, and control mechanism arranged to immediately respond to direct changes in absolute physical characteristics of the induction gas stream independently of humidity conditions and of the temperature range of the gas stream and to operate said means in a manner to prevent over-cooling of said gases.

7. The combination with a spark-fired internal combustion engine having a supercharger, of a heat-exchanger disposed in the induction system, a scoop arranged to project into the air-stream around the aircraft and to direct temperature-controlling air through said heat-exchanger, control mechanism arranged to move said scoop into and out of the air-stream and arranged automatically to follow absolute physical characteristics of the induction gas stream whereby overcooling of said gases by the cooling air is prevented.

8. The combination with a spark-fired internal combustion engine having a supercharger, of a heat-exchanger disposed in the induction system, an injector and an ejector arranged to project into the air-stream around the aircraft, and to generate a flow of temperature-controlling air through said heat-exchanger, control mechanism arranged to move at least the injector into and out of the air-stream, which control means is adapted to follow direct changes in the absolute physical characteristics of the induction gas stream, and control the flow of cooling air in a manner to prevent overcooling of said gases.

9. The combination with a spark-fired internal combustion engine having a carburetor and supercharger, of a heat-exchanger disposed in the induction system, a throttle controlling the flow of combustible gases through the induction system, a scoop adapted to project into the air-stream around the aircraft and to direct temperature-controlling air through said heat-exchanger, a control mechanism for moving said scoop into and out of the air-stream, means for connecting the control mechanism to the throttle so that changes in the setting of the latter directly control the rate of flow of cooling air through the heat-exchanger in a manner to prevent over-cooling of the combustible gas.

10. The combination with a spark-fired internal combustion engine having a supercharger, of a heat-exchanger disposed in the induction system, a source of hot temperature-controlling fluid, a source of cold temperature-controlling fluid at a lower temperature than that of the supercharged gas, means for placing either of said sources into communication with the heat-exchanger, control mechanism associated with said means and arranged automatically to follow direct changes in absolute physical characteristics of the induction gas stream so as to vary the temperature of the controlling fluid to the heat-exchanger in a manner to prevent over-cooling of said gases.

11. The combination with a spark-fired internal combustion engine having a supercharger, of a heat-exchanger disposed in the induction system, a second heat-exchanger receiving cooling air from the air-stream around the aircraft and arranged to control the temperature of temperature-controlling fluid for the first heat-exchanger within a range including a temperature lower than that of the supercharged gas, means for controlling the flow of air to the second heat-exchanger, control mechanism arranged to operate said means, and automatically to follow direct changes in absolute physical characteristics of the induction gas stream in a manner to control the temperature-controlling fluid flowing to the first said heat-exchanger, and in a manner to prevent overcooling of the induction gas stream.

12. The combination with a spark-fired internal combustion engine having a supercharger, of a heat-exchanger disposed in the induction system, means for supplying temperature-controlling fluid to said heat-exchanger within a temperature range including a temperature lower than that of the supercharged gas, means for varying the heat-exchanging capacity of the temperature-controlling fluid flowing through the heat-exchanger, a pressure-responsive device disposed in the induction system, connected therein at a single point upon the outlet side of said supercharger, and arranged to follow direct changes in the absolute pressure conditions of the induction gas stream, an interconnection between the pressure-responsive device and the first said means so as to operate said means in a manner to prevent overcooling of said gases.

13. The combination with a spark-fired internal combustion engine, having a supercharger, of a heat-exchanger disposed in the induction system, means for supplying temperature- controlling fluid to said heat-exchanger within a temperature range including a temperature lower than that of the supercharged gas, means for varying the heat-exchanging capacity of the temperature-controlling fluid flowing to the heat-exchanger, an automatic supercharger control adapted to act in response to change in the absolute physical characteristics of the supercharged gas, means interlinking said control with the means for varying the heat-exchanging capacity, so that direct changes in the absolute physical characteristics of the supercharged gases also control the temperature-controlling fluid flowing through the heat-exchanger in a manner to prevent overcooling of the supercharged gases.

14. The combination with a spark-fired internal combustion engine having a supercharger, of a heat-exchanger disposed in the induction system, means for supplying temperature-controlling fluid to said heat-exchanger within a temperature range including a temperature lower than that of the supercharged gas, means for varying the heat-exchanging capacity of the temperature-controlling fluid to the heat-exchanger, a thermostat having its heat-responsive element disposed in the induction system, an interconnection between said thermostat and the aforesaid means, which thermostat is arranged to follow changes in the absolute temperature of the induction gas stream so as to operate said means in a manner to prevent overcooling of said gas stream.

15. The combination with a spark-fired internal combustion engine having a supercharger, of a heat-exchanger disposed in the induction system, means for supplying temperature-controlling fluid to said heat-exchanger within a temperature range including a temperature lower than that of the supercharged gas, means for varying the heat-exchanging capacity of the temperature-controlling fluid flowing to the heat-exchanger, a pressure-responsive device and a thermostat disposed in the induction system, and adapted to follow respectively changes in the absolute pressure of the induction system and the absolute temperature of the induction gases, an interconnection between the first said means and the thermostat and the pressure-responsive device so as to control the temperature-controlling fluid in a manner to prevent overcooling of the induction gases.

16. The combination with a spark-fired internal combustion engine having a supercharger and a carburetor associated therewith, of a heat-exchanger disposed in the induction system, means for supplying temperature-controlling fluid to said heat-exchanger within a temperature range including a temperature lower than that of the supercharged gas, means for varying the heat-exchanging capacity of the temperature-controlling fluid flowing to the heat-exchanger, a thermostat having its temperature-responsive element in the induction system and adapted to follow direct changes in the absolute temperature of the induction gas stream, a throttle lever for the carburetor, an interconnection between the means for varying the heat-exchanging capacity of the temperature-controlling fluid and the throttle lever and thermostat whereby changes in throttle setting and of the temperature conditions of the induction system operate the first said means in a manner to prevent overcooling of the gas stream.

17. The combination with a spark-fired internal combustion engine having a supercharger and carburetor control, of a heat-exchanger disposed in the induction system, means for supplying temperature-controlling fluid to said heat-exchanger within a temperature range including a temperature lower than that of the supercharged gas, means for varying the heat-exchanging capacity of the temperature-controlling fluid flowing through the heat-exchanger, a thermostat having its temperature-responsive element disposed in the induction system and adapted to follow direct changes in the absolute temperature conditions of the gases, a pressure-responsive device adapted to follow direct changes in the absolute pressure conditions of the supercharged gases, and an interconnection between the first said means, the carburetor control, pressure-responsive device and thermostat, arranged to operate said means in a manner to prevent overcooling of the gas stream.

18. A method of controlling the temperature of a combustible charge in a spark-fired supercharged internal combustion engine which consists in causing the charge to flow through a heat-exchanger, in supplying the heat-exchanger with a temperature controlling fluid within a temperature range including a temperature lower than that of the supercharged gas, and in varying the heat-exchanging capacity of said heat-exchanger in response to direct changes in the absolute physical characteristics of the induction gas stream independently of humidity conditions and the temperature range of the gas stream.

19. A method of controlling the temperature of a combustible charge in a spark-fired internal combustion engine having a supercharger, which consists in causing the supercharged gases to flow through a heat-exchanger, in supplying the heat-exchanger with a temperature controlling fluid within a temperature range including a temperature lower than that of the supercharged gas, the temperature of which is controlled in accordance with direct changes in absolute physical characteristics of the induction gas stream.

20. A method of controlling the temperature of a combustible charge in a spark-fired internal combustion engine having a throttle controlled carbureter and a supercharger, which consists in causing the supercharged gases to flow through a heat-exchanger, in supplying the heat-exchanger with a temperature controlling fluid within a temperature range including a temperature lower than that of the supercharged gas, and in varying the heat-exchanging capacity of said heat-exchanger in accordance with changes in the throttle setting and in a manner to prevent overcooling of said stream.

21. A method of controlling the temperature of a combustible charge in an internal combustion engine having a supercharger, which consists in causing the supercharged gases to flow through a heat-exchanger, in supplying the heat-exchanger with a temperature controlling fluid within a temperature range including a temperature lower than that of the supercharged gas, and in varying the heat-exchanging capacity of said heat-exchanger in accordance with changes in absolute temperature conditions of the induction gas stream in a manner to prevent overcooling of said stream.

WILLIAM HELMORE.